United States Patent Office 3,061,434
Patented Oct. 30, 1962

3,061,434
NOVEL SUBSTITUTED SILVER HALIDE
DEVELOPING AGENTS
Milton Green, Newton Highlands, and Warren E. Solodar, Watertown, Mass., assignors to Polaroid Corporation, Cambridge, Mass., a corporation of Delaware
No Drawing. Filed Aug. 26, 1957, Ser. No. 680,406
12 Claims. (Cl. 96—66)

This invention relates to novel chemical compounds and more particularly to certain novel chemical compounds useful in the development of photosensitive silver halide elements.

One object of this invention is to provide novel chemical compounds and the syntheses for their preparation.

Another object of this invention is to provide novel photographic developing agents, products, compositions, and processes for the development of silver halide emulsions.

Other objects of this invention will in part be obvious and will in part appear hereinafter.

The invention accordingly comprises the several steps and the relation and order of one or more of such steps with respect to each of the others, and the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

The novel compounds of this invention may be represented by the formula:

(A)     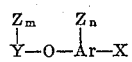

wherein Ar is an aryl nucleus, such as a benzene or naphthalene nucleus; each Z is an alkyl group, preferably a lower alkyl such as methyl or ethyl, or a halogen such as chlorine; $m$ is 0, 1, 2 or 3; $n$ is 0, 1 or 2; X is a primary, secondary or tertiary amino, or a nitro group; and Y is a p-dihydroxyphenyl, a p-bis-acyloxyphenyl, an o-dihydroxyphenyl, an o-bis-acyloxyphenyl, a p-bis-alkoxyphenyl or an o-bis-alkoxyphenyl group.

In a preferred embodiment, Ar is a benzene nucleus, X is a primary amino group and such compounds may be represented by the formula:

(B)     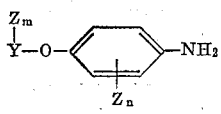

wherein Y, $m$, $n$, and Z have the same meaning as above.

The preferred compound within the group represented by Formula B is:

(C)     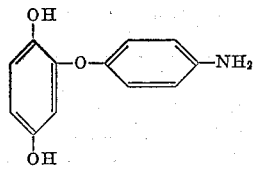

p-Aminophenoxyhydroquinone

The amino compounds of this invention may be present in the form of acid addition salts, such as the hydrochloride.

One method of preparing compounds within the scope of this invention comprises reacting an alkali metal salt of ortho or para dialkoxyphenolate with a nitro aryl halide compound at an elevated temperature, dealkylating the respective alkoxy groups and reducing the nitro group.

Alternatively, the hydroxyl groups formed by the dealkylation reaction may be protected during subsequent reactions, e.g., diazotization, by acylation, for example by carbethoxylation, acetylation, etc. which can be effected most conveniently before reduction of the nitro group.

Where the secondary or tertiary amine derivatives are desired, the amino group may be suitably alkylated, preferably before removing the hydroxy protective groups.

The following example illustrates the preparation of compounds within the scope of this invention and is given for purposes of illustration only.

Example 1

2,5-dimethoxyphenol was prepared according to the procedure of Burger in the JACS 75, page 1359 (1953). The potassium salt of 2,5-dimethoxyphenol was prepared according to the procedure of Gilman in the JACS 61, page 1370 (1939). An intimate mixture of 25 g. of 2,5-dimethoxy-potassium-phenolate (0.12 mol), 25 g. of p-fluoronitrobenzene (0.175 mol), 0.5 g. of 2,5-dimethoxyphenol, and 0.2 g. of copper powder (prepared as per Organic Syntheses, Collective Volume II, page 446), is maintained at 155 to 160° C. for one hour. The mixture darkens initially, melts completely in about 3 minutes and ebullates for approximately the hour, gradually becoming light amber in color. The melt is poured into a mixture of 200 cc. of ice water and 15 cc. of 3 N sodium hydroxide. An amber oil separates which soon solidifies. The solid is filtered off and crystallized from 100 cc. of ethanol. The resultant product, 25 g. of light yellow crystals, is vacuum dried over phosphorus pentoxide, and melts at 76 to 76.5° C.

Analysis of this product, calculated as p-nitrophenoxyhydroquinone dimethyl ether, $C_{14}H_{13}NO_5$, gives:

|  | C | H | N |
|---|---|---|---|
| Calculated (percent) | 61.1 | 4.8 | 5.1 |
| Found (percent) | 61.0 | 4.9 | 5.2 |

A solution of 15.5 g. of the above product in 200 cc. of acetic acid and 200 cc. of 48% aqueous hydrogen bromide is refluxed for approximately 6 hours and then evaporated to dryness under a vacuum. The resultant yellow crystalline residue, p-nitrophenoxyhydroquinone, melting at 169 to 171° C., is dried in a vacuum desiccator over potassium hydroxide. It is then refluxed in 250 cc. of acetyl chloride for 1.5 hours on a steam bath, evaporated under vacuum to remove excess acetyl chloride and crystallized from 200 cc. of ethanol. 16.5 g. of p-nitrophenoxyhydroquinone-O,O'-diacetate are obtained as white needles, melting at 111 to 113° C. A solution of 3 g. of the above product in 150 cc. of warm ethanol is hydrogenated with 2 atmospheres of hydrogen in the presence of 5 g. of a palladium-barium sulfate catalyst. The catalyst is removed by filtration and the solution concentrated to approximately 20 cc. Crystallization is induced by scratching the wall of the container, yielding 2 g. of p-aminophenoxyhydroquinone-O,O'-diacetate, a white, crystalline material melting at 112 to 113° C.

Analysis of this product gives:

|  | C | H | N |
|---|---|---|---|
| Calculated as $C_{16}H_{15}NO_5$ (percent) | 63.9 | 5.0 | 4.7 |
| Found (percent) | 63.8 | 5.3 | 4.7 |

The product of Example 1 can be used directly in subsequent diazotization and coupling reactions.

p-Aminophenoxyhydroquinone may be prepared by the hydrogenation, in the presence of a palladium-barium sulfate catalyst, of p-nitrophenoxyhydroquinone which has been prepared according to the procedure of Example 1 or in the alternative by the hydrolysis of p-aminophenoxy-hydroquinone-O,O'-diacetate which has been prepared according to the procedure of Example 1.

As noted previously, the novel p-dihydroxyphenyl and o-dihydroxyphenyl compounds of this invention are useful as photographic developing agents. As an example of a suitable aqueous photographic developer composition containing a compound of this invention and useful in conventional black-and-white tray or tank development the following example is given for purposes of illustration only.

*Example 2*

An aqueous solution of approximately:

|  | Percent |
|---|---|
| p-Aminophenoxyhydroquinone | 2 |
| Sodium sulfite | 2 |
| Potassium bromide | 0.5 |
| Sodium hydroxide | 2 |

The novel developing agents of this invention may also be used in diffusion transfer reversal processes such as disclosed in U.S. Patent No. 2,543,181, issued February 27, 1951, to Edwin H. Land. Suitable silver halide solvents such as sodium thiosulfate and a viscous reagent, e.g., sodium carboxymethyl cellulose, may be added to the composition of Example 2 to render it suitable for use in such processes.

It will be apparent that the relative proportions of the components of the developer compositions set forth above may be varied to suit the requirements of the operator. Thus it is within the scope of this invention to modify said developing compositions by the substitution of preservatives, additional developing agents, alkalies, silver halide solvents, etc., other than those specifically mentioned. It is also contemplated that where desirable the said developer compositions may be modified by the inclusion of other common components of developer compositions such as restrainers, accelerators, etc. Similarly, the concentration of the developing agent may be varied over a wide range and where desirable said agent may be disposed in the photosensitive emulsion prior to the exposure of said emulsion.

Particularly useful developing compositions also contain a small amount of an auxiliary or accelerating developer such as Metol (p-methylaminophenol), benzylaminophenol or a 3-pyrazolidone, such as 1-phenyl-3-pyrazolidone, etc. The preferred accelerating developer is 1-phenyl-3-pyrazolidone.

The novel acyl compounds of this invention are useful chemical intermediates. They are especially useful in reactions wherein it is desired that the reaction be restricted to the amino group and where it is desired that the hydroxyl groups be protected during reaction and yet readily regenerated after the reaction is completed. In particular, the novel acyl compounds of this invention are useful as intermediates in the preparation of azo compounds, in accordance with the procedures disclosed in the copending application of Milton Green, Serial No. 680,403, filed August 26, 1957.

When employed as photographic developing agents the novel amino compounds of this invention may be introduced in the form of the free base or as salts thereof, such as the hydrochloride. Thus the salt may be employed where the developing agent is to be incorporated in, on or behind the silver halide emulsion or where one desires to prepare a dry developer composition, the solvent being added to the dry composition prior to use.

Since certain changes may be made in the above processes, products and compositions without departing from the scope of the invention herein involved, it is intended that all matter contained in the above description shall be interpreted as illustrative and not in a limiting sense.

What is claimed is:
1. A photographic developer composition comprising an aqueous alkaline solution of a first and a second silver halide developing agent, said first silver halide developing agent being a compound of the formula:

Y—O—Ar—X wherein Ar is a phenylene nucleus, X is an amino group, and Y is a dihydroxyphenyl silver halide developing radical, said second silver halide developing agent being capable of accelerating said first silver halide developing agent.

2. A photographic developer composition as defined in claim 1 wherein said second silver halide developing agent is a 3-pyrazolidone.

3. A novel photographic developer composition as defined in claim 1 wherein said second silver halide developing agent is 1-phenyl-3-pyrazolidone.

4. A novel photographic developer composition as defined in claim 1 wherein said first silver halide developing agent is p-aminophenoxyhydroquinone.

5. A method of developing a silver halide emulsion which comprises treating an exposed silver halide emulsion with an aqueous alkaline solution of a silver halide developing agent of the formula:

Y—O—Ar—X wherein Ar is a phenylene nucleus, X is an amino group, and Y is a dihydroxyphenyl silver halide developing radical.

6. A method as defined in claim 5 wherein said silver halide developing agent is p-aminophenoxyhydroquinone.

7. A method as defined in claim 5 wherein said silver halide developing agent is disposed prior to exposure in a photosensitive element containing said emulsion and the solution containing said silver halide developing agent is formed by permeating said photosensitive element with an aqueous alkaline solution capable of solubilizing said silver halide developing agent.

8. A photographic product comprising a support, a layer containing a silver halide emulsion on said support, and a silver halide developing agent in a layer on the same side of said support as said silver halide emulsion, said silver halide developing agent being a compound of the formula:

Y—O—Ar—X wherein Ar is a phenylene nucleus, X is an amino group, and Y is a dihydroxyphenyl silver halide developing radical.

9. A product as defined in claim 8 wherein said product contains a second silver halide developing agent which is capable of accelerating the first-mentioned silver halide developing agent.

10. A product as defined in claim 9 wherein said second silver halide developing agent is a 3-pyrazolidone.

11. A product as defined in claim 9 wherein said second silver halide developing agent is 1-phenyl-3-pyrazolidone.

12. A product as defined in claim 8 wherein said silver halide developing agent is p-aminophenoxyhydroquinone.

References Cited in the file of this patent

UNITED STATES PATENTS

| 2,604,399 | Donovan et al. | July 22, 1952 |
| 2,698,244 | Land | Dec. 28, 1954 |
| 2,751,295 | Salminen et al. | June 19, 1956 |
| 2,777,879 | Spiegler | Jan. 15, 1957 |
| 2,780,647 | Spiegler | Feb. 5, 1957 |
| 2,835,575 | Cowden et al. | May 20, 1958 |

OTHER REFERENCES

Mees: The Theory of the Photographic Process, Macmillan (pages 552, 553, 558–560).